INVENTORS
WILLIAM L. PRINGLE
JOHN S. CUCHERAN

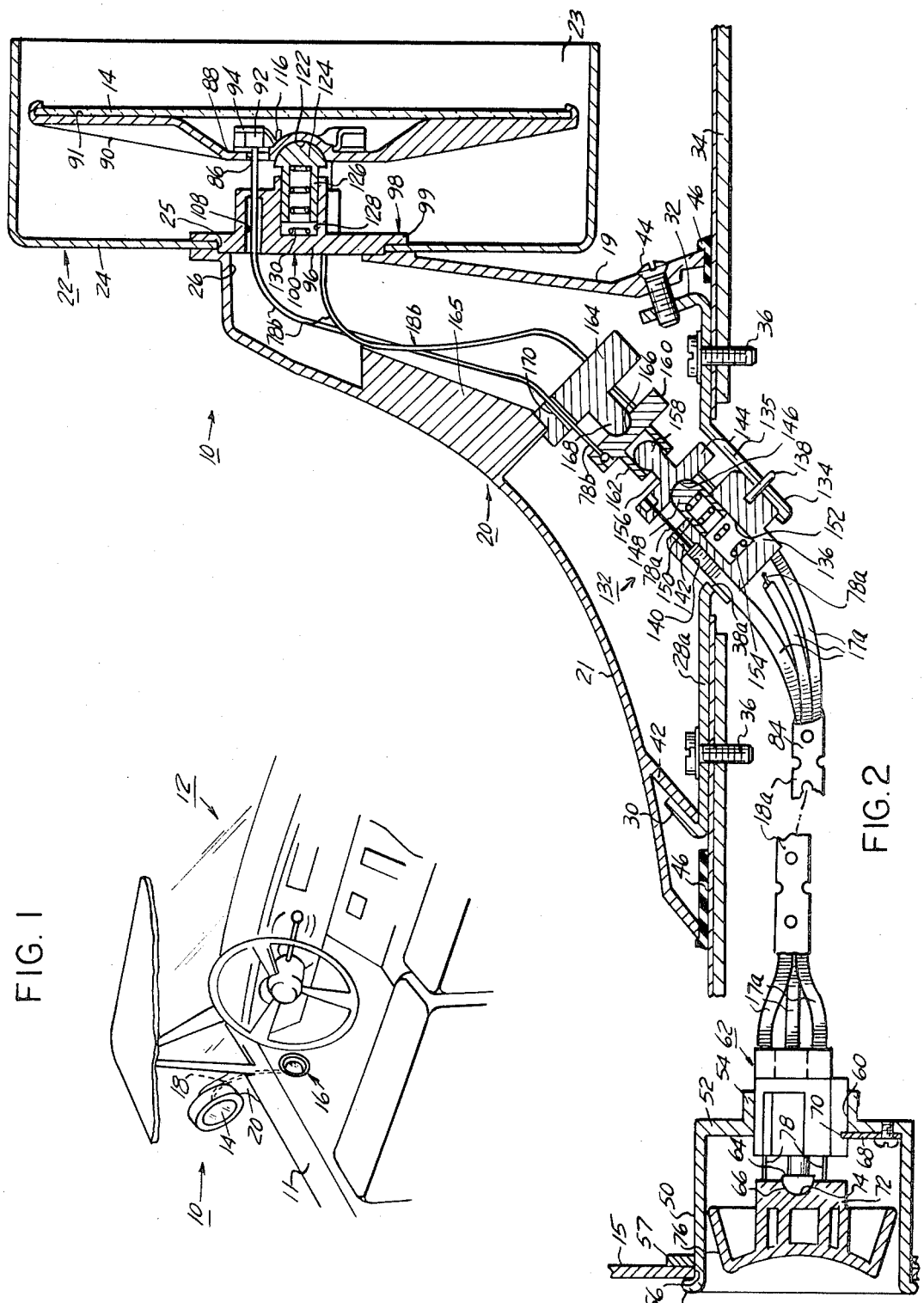

ATTORNEYS

Dec. 29, 1970  W. L. PRINGLE ET AL  3,550,468
REMOTELY CONTROLLED REAR VIEW MIRROR
Filed Dec. 3, 1968  3 Sheets-Sheet 3

INVENTORS
WILLIAM L. PRINGLE
JOHN S. CUCHERAN
BY Hauke, Krass, Gifford, & Patalides
ATTORNEYS

United States Patent Office 3,550,468
Patented Dec. 29, 1970

3,550,468
REMOTELY CONTROLLED REAR VIEW MIRROR
William L. Pringle, Grosse Pointe Shores, and John S. Cucheran, Pleasant Ridge, Mich., assignors to Lee Radke Associates, Inc., Detroit, Mich., a corporation of Michigan
Filed Dec. 3, 1968, Ser. No. 780,738
Int. Cl. F16c 1/10; G02b 7/18
U.S. Cl. 74—501                                                       11 Claims

ABSTRACT OF THE DISCLOSURE

An outside rear view mirror assembly for a vehicle or the like comprising a pivotal mirror mounted exteriorly on the vehicle connected to said mirror by a plurality of cables to allow adjustment of the mirror by a manipulation of the control member and including a quick disconnect coupling to permit replacement of the mirror without disassembly of the internal cable control mechanism.

BACKGROUND OF THE INVENTION

(I) Field of the invention

The present invention relates to a remote control mechanism and more particularly to a rear view mirror device for automobiles and the like and means for positioning such mirror device from a point spaced therefrom.

Outside automotive rear view mirrors of the type mounted on the fender or door of a vehicle have been universally adopted as a required safety standard. Because these mirrors are normally, for purposes of visibility, inconveniently positioned for manual adjustment by the operator of the vehicle from his driving compartment and because there are differences in individual preferences and requirement for positioning such mirrors for different operators and there is a tendency for such mirrors to be jarred out of adjustment during operation of the vehicle, many attempts have been heretofore made to provide an apparatus for remotely adjusting the mirror elements from inside the vehicle compartment for optimum visibility. It is, of course, desirable that the operator be able to re-adjust the mirror without having to lower the window to extend his hand outside of the vehicle to manipulate the mirror element. Further, if a rear view mirror assembly is provided on the passenger side of the automobile or on the left front fender it is out of the reach of the operator and unless some type of remote control apparatus is provided it is impossible for the operator to adjust these mirrors from inside the vehicle.

(II) Brief description of the prior art

Various approaches have been made in the past to provide mechanisms for remotely controlling the position of a rear view mirror attached to an exterior body portion of the automobile, such as the door or fender. Efforts to achieve remote adjustability in the prior art have included various kinds of remote control mechanism which employ gearing arrangements to achieve the control. These, while functioning satisfactorily, have proven to be too expensive for commercial success.

Anther approach to achieve this objective has been to utilize a plurality of Bowden cables which are connected to a mirror holding element at one end and to an operator control element at the opposite end. Normally, the operator manipulates the control element, and the motion of the control element is transmitted through the Bowden cables to the mirror holding element. Because of simplicity and better economies, as compared to gearing arrangements, this type of motion transmitting mechanism for rear view mirrors has become more popular in recent times. However, although the mirror element can be readily adjusted through the use of such cables, other problems have arisen. The ability of the mirror to maintain the adjusted position under varying environmental forces such as vibrations of the vehicle due to road conditions, wind forces and the like has not been to the extent desired.

Another major problem inherent with conventional control mechanisms for remotely positioned rear view mirrors lies in the assembly of the cables. Heretofore, it has been necessary to connect the ends of the operating cables to the mirror base prior to attaching the mirror glass to the base. The mirror base normally has a somewhat dished configuration provided with apertures aligned with each wire of the cables. The wire of the cables are threaded through the apertures and provided with an enlarged end, such as a knob or plug, disposed within the mirror base. The periphery of the base is then flanged by a turning process or the like to retain the mirror element and an associated felt backing member.

There are several problems connected with this type of construction. The combination of the mirror base and complete cable assembly is difficult to assemble in the body structure of the automotive vehicle since there is a hazard of shattering the mirror as the attached cables are threaded through the various openings in the vehicle body from the fender or door section to the operator controlled element in the driver compartment. Further, the particular manner of fastening the mirror to the base and backing member has heretofore required a rotation of these two members and in the prior constructions the manner of connecting the cables to the mirror has required that this be done with the complete cable assembly attached. This has produced a difficult manufacturing operation.

Another major drawback in conventional remote control mechanism lies in the configuration of the operator control member, which conventionally takes the form of a pivoted actuating post which extends from the surface of an interior section of the vehicle body, such as the door panel or the dashboard. The operator of the vehicle normally manually grips the actuating post and by manipulating the post achieves the desired positional adjustment of the mirror element. However, numerous studies made in recent years regarding the cause of injuries to the occupants of vehicles involved in accidents where the vehicle experiences a sudden sharp deceleration in its forward rate of travel, indicates that many injuries are caused by a sudden change in the occupant's relative position within the vehicle which causes the occupant to come into contact with various projecting members disposed within the interior of the vehicle. Projecting members of this character include functional members such as gearshift levers, interiorly mounted rear view mirrors, and actuating handles and knobs and the like, such as those used for remote control actuation of outside mirrors, which constitute a safety hazard.

A further disadvantage of conventional remote control mechanism is the inability of disassembling of the adjustable member for servicing or replacement without having to disassemble the complete cable mechanism which is a difficult and time consuming job.

Accordingly, the present invention provides novel means and improved structures for a cable type remote control mechanism to eliminate some or all of the aforementioned disadvantages of conventional remote control mechanism.

SUMMARY OF THE INVENTION

The disclosed structures of the remote control mechanism illustrating preferred embodiments of the present invention obviate the problems of assembly encountered in conventional remote control mechanism. This improved result is achieved by providing a mirror base in which the ends of the cable wires are connected to the mirror by means of the wires extending through an adapter associated with the mirror support and then through the mirror base to be positioned between the mirror base and the rear of the mirror in which position they are retained by a spring snap ring which locks the cable wires to the mirror base.

The assembly operation is further improved by the fact that the cables of the present invention are of equal length and are interchangeable thus reducing the manufacturing costs inherent in conventional remote control cable mechanisms wherein the cables had to be of dissimilar lengths.

The control mechanism of the present invention also provides for a positively adjustable mirror element which is readily responsive to manipulation of the control cables and wherein the ability of the mirror to stay in place is dependent on the position of the control cables. This improved stability of the invention is achieved by providing a mirror base with a central portion having a semi-spherical socket formed therein. This socket is adapted to engage a semi-spherical ball member provided in the adapter associated with the mirror support. The mirror is mounted for universal movement with respect to the mirror support by mating of the respective semi-spherical shaped socket and ball members and joining the two members together by means of the cables. The ball member is provided with spring means to assure that the mating semi-spherical surfaces will in all positions be snugly joined to one another. The spring mounted pivot means assures that the mirror element will be stable in all positions and under any operating conditions.

Likewise, the herein disclosed quick disconnect coupling is composed of a plurality of pivotally co-acting ball and socket joints to enable the correct transmission of the cable push-pull force from the main cable portion to the mirror cable portion in the proper order to actuation.

The present invention further provides a control element in the form of a recessed mounted button within the vehicle compartment so that the danger of injury from this source is largely eliminated. The particular construction of the actuating or control assembly provides precise control of the mirror by manipulation of the pivotally mounted button.

As a further object of the present invention, provisions are made to improve remotely controlled mirror assemblies by providing a releasable connection between the ends of the cables for such assemblies providing a main cable portion which may be first assembled within the vehicle body and a mirror cable portion to be separately connected to the mirror base.

As a primary object, the present invention provides a quick release cable coupling within the mirror support bracket to permit easy disassembly of the exterior mirror assembly for servicing or replacement without disturbance of the interior cable control structure. This release coupling is in the form of a snap-off/snap-on connection having a releasable member to which the control wires of the mirror are connected and which is adapted to be snapped onto a spring loaded pivot member to which the wire ends of the interior control cables are connected so that the respective motions of the control cables will be transferred through the coupling to the respective control wires of the mirror.

Still further objects and advantages of the present invention will readily occur to one skilled in the art to which the invention pertains upon reference to the following detailed description which makes reference to the accompanying drawings and in which like reference characters refer to like parts throughout the several views.

BRIEF DESCRIPTION OF THE DRAWINGS

FIG. 1 is a perspective view illustrating a remotely controlled rear view mirror assembly embodying the present invention mounted on the outside of the left front door of an automotive vehicle and which is controlled by a manual control member mounted in the interior door panel of the vehicle;

FIG. 2 is an enlarged elevational cross-sectional view taken through the mirror and control member assembly illustrated in FIG. 1 showing the quick release coupling provision and internal control member in detail;

DESCRIPTION OF SEVERAL PREFERRED EMBODIMENTS

Figure 3:
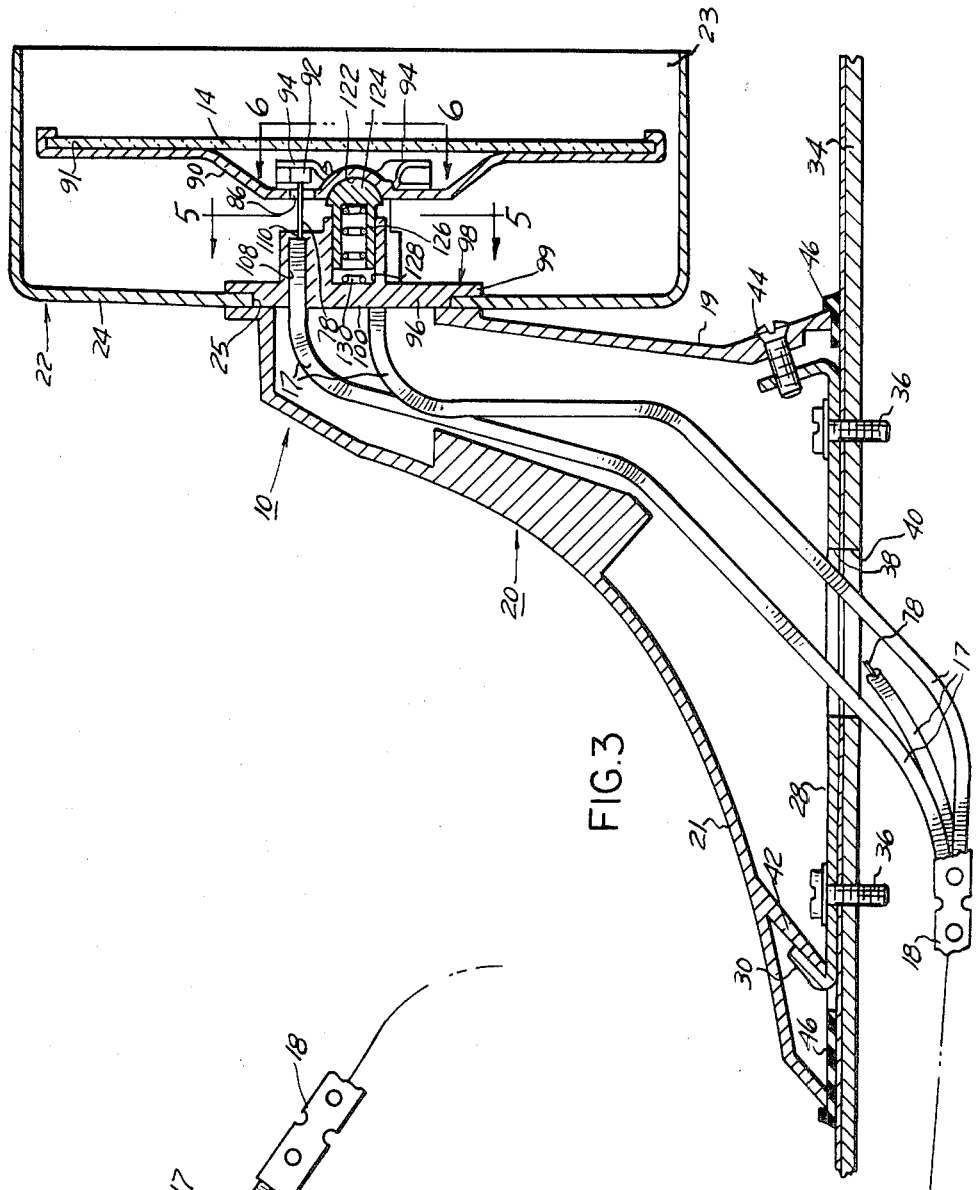
FIG. 3 is a sectional view similar to FIG. 2 but without the quick release feature.

With reference to the drawings, for a more detail description of the present invention, a mirror assembly, generally indicated at 10, is shown in FIG. 1 as mounted on the left front door 11 of an automotive vehicle 12. It will be apparent as the description proceeds that a similar mirror assembly 10 could also be mounted on the right door of the vehicle, or in either or both front fenders of the vehicle. The mirror assembly 10 preferably includes a mirror element 14 facing rearwardly to provide a view for the operator of the vehicle of conditions to the side and rear of the vehicle 12. The mirror element 14 is remotely adjusted for maximum viewability in response to a manipulative movement by the vehicle operator of a control assembly 16 preferably mounted to the inside door panel 15 of the vehicle 12 to the left of the operator and which movement is transmitted through control cable assembly 18 to the mirror element 14.

Referring now to FIGS. 2 and 3, the mirror assembly 10 includes a hollow bracket support 20 which supports a protective mirror enclosure 22 upon a convenient exterior supporting section of the automotive vehicle 12 such as the front door 11. The bracket support 20 has a front wall 19 and a flared lower portion 21, and is preferably secured to the vehicle door in the following manner as described and shown for illustration: A retainer clip 28 having opposite bent-over flange portions 30 and 32 is secured to an outside panel 34 of the vehicle body by means of fasteners 36. The retainer clip 28 has an aperture 38 which is aligned with an aperture 40 in the panel 34. The flared lower portion 21 of the hollow support bracket 20 is inwardly provided with an angularly downwardly extending tongue 42 at the rear of the bracket adapted upon assembly to be fitted underneath the bent-over flange portion 30 of the retainer 28. The front wall 19 of the bracket support 20 is then fastened to the opposite bent-over flange 32 of the retainer clip by means of fasteners 44 which upon tightening draws the inner tongue 42 against the flange 30 to thus securely retain the bracket support upon the outside body panel 34. Preferably, a sealing member 46 is placed around the lower edges of the support bracket between the bracket and the body panel to prevent entry of water into the interior of the bracket.

Although a specific support bracket and mode of attachment has been described herein and is shown in the drawings, it will be obvious that the particular shape and means of attachment of the support bracket is of no importance and does not as such form a part of the present invention.

The protective enclosure 22 can be of any desired configuration, such as circular, as shown in FIG. 1, or rectangular or elliptical as the case may be, and is dished to provide an open end 23 and a closed rear wall section 24 provided with a central aperture 26 which is aligned with a front opening 25 of the bracket support 20. The enclosure 22 is attached to the bracket support by any conventional means (not shown). The central aperture 26 receives an adapter member 48 to which the mirror element 14 is pivotally mounted.

With reference to FIG. 2, the cable control assembly 16 is illustrated as being preferably mounted on an interior door panel section 15 of the vehicle 12 and preferably includes a substantially cylindrical cup 50 which is adapted to be inserted through a suitable opening 56 provided in the door panel 15 to be mounted thereon in position by means of a retainer ring 57 and outer flange portion 58. The cup has a bottom portion 52 and axially outwardly extending flange portion 54 provided with a centrally disposed opening 60 which receives a cable support and clamping member 62.

The cable support member 62 is constructed to receive a plurality of cables 17 of the cable assembly 18 which has a centrally disposed pivot member 64 suitably clamped therein and provided with a substantially semi-spherically formed convexly shaped surface 66. The cable support member 62 is preferably secured to the cup 50 by means of a key 68 extending into a slot 70 formed in the exterior surface of the member 62. The key 68 is attached to the bottom 52 of the cup 50 by means of a fastener to thus securely retain the cable support member 62 in position.

The button member 72 is formed with a semi-spherically formed concave surface 74 to be pivotally supported on the surface 66 of the pivot member 64. The button member 72 is adapted and suitably provided to receive and secure the end portions of the individual wires 78 of the cables 17.

The button member 72 is attached to an actuating button 76. If desired, the joining of the member 72 and 76 can be made by providing a suitable adhesive between the mating surfaces. To aid in promoting pivotal movement between the button members 72 and the convex surface 66, either or both of these members can be made of a suitable low-friction material, such as Teflon.

Figure 4:
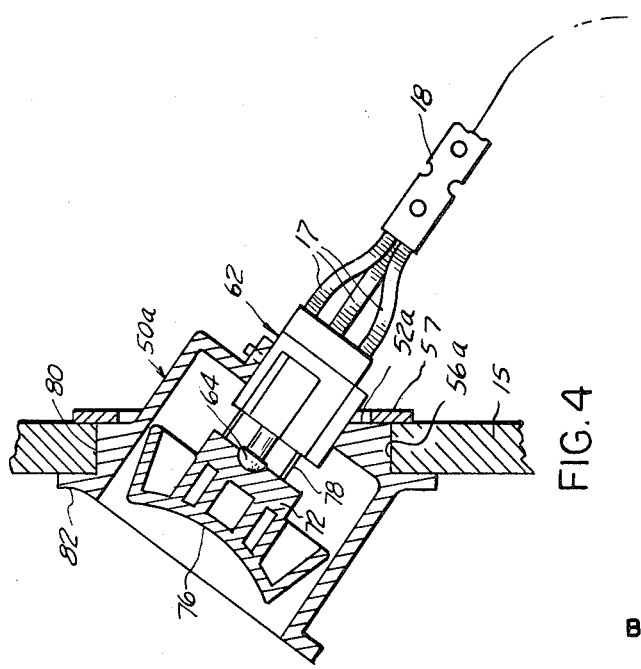
FIG. 4 illustrates a further embodiment of the means for attachment of the control member to the door panel.

In reference to FIG. 4, an alternate mounting of the control assembly 16 is illustrated. In this instance, the button protecting cup 50a is mounted at an angle to the surface of the door panel 15 by the provision of an annular surface 80 extending diagonally around the cup 50a from the bottom 52a thereof to the front opening by which the cup 50a is mounted within the aperture 56a in the door panel 15. To retain the cup 50a within the aperture 56a, an annular flange 82 is provided adjacent to the annular surface 80 to abut against the outer surface of the door panel 15. The cup 50a may be secured by conventional fastening means through the flange 82 or by means of the retainer ring 57 as shown. This mounting is provided and preferred to improve the accessibility to the control button 76.

With reference again to FIG. 3, the cable assembly 18, which is preferably enclosed in a protective sheathing, is composed of a plurality of cables 17 of the Bowden type, that is, they each enclose a movable wire 78 which is longitudinally movable relative to the outer sheathing of the cables 17. For this type of remote control mechanism generally three individual cables 17 have been found to be sufficient to obtain maximum angular positioning of the mirror 14 in all directions.

In the embodiment in FIG. 3, the cable assembly 18 is threaded through the interior of the body structure of the vehicle which in this instance may be the vehicle door 11, to exit through an aperture 40 in the outside door panel 34 and into the hollow support bracket 20 through which the cables continue upwardly towards the mirror 14.

The ends of the individual cables 17, as can be seen, extend in angularly spaced relationship into and are securely clamped within an adapter 98 which covers the front opening 25 of the support bracket 22. The ends of the wires 78 of the cables 17 extend from the cables and out of the adapter 98 through radially aligned apertures 86 within a recessed central portion 88 of a mirror base support 90 which carries the mirror element 14. The apertures 86 in the base 90 are of a larger diameter than the diameters of the wires 78 to allow the enlarged heads 92 of the wires to extend therethrough whereafter they are locked in place on the mirror base 90 by means of a spring type clamping ring 94.

Figure 5:
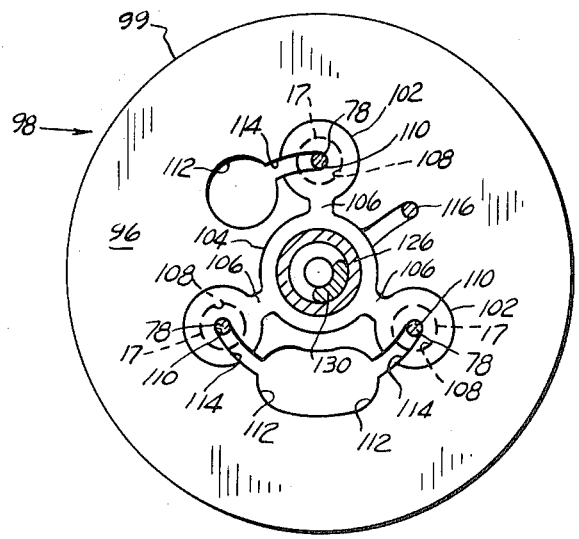
FIG. 5 is an enlarged plan view of the wire adapter assembly as seen along line 5—5 in FIG. 3 to which the mirror is attached and which is identical to both embodiments shown in FIGS. 2 and 3.
Figure 6:
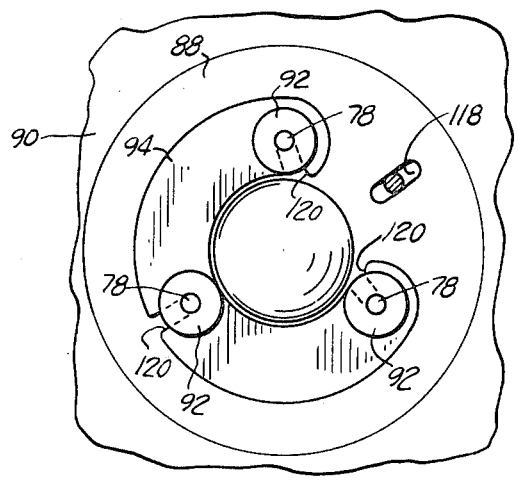
FIG. 6 is an enlarged plan view of the snap ring lock of the ends of the wire for attachment to the mirror base as seen along line 6—6 in FIG. 3.

With particular reference to FIGS. 5 and 6, the adapter 98 has a base portion 96 extending into a radial flange 99 (FIGS. 2 and 3) by which the mirror enclosure 22 is clamped against the support bracket 20. A triangular formed boss portion 100 extends centrally from the base 96 of the adapter 98, and provides individual cylindrical protrusions 102 radially spaced in equiangular distances from each other around a cylindrical center protrusion 104 of the boss portion to which they are connected by ridges 106. The cylindrical protrusions 102 correspond in number to the numbers of individual cables 17 used in the assembly and are each provided with bores 108 to receive and clamp the ends of the outer cables 17. The bores 108 are not through bores but end short of the top end. An outward communication of the bores 108 is provided by coaxially aligned smaller bores 110 for the extension of the wire 78 therethrough. Adjacent the cylindrical protrusions 102, the base 96 is provided with apertures 112 of relatively large diameter to allow the passage of the enlarged heads 92 of the wires therethrough, as will be explained. The apertures 112 are connected with apertures 108 and 110 by means of radial slots 114 extending through the walls of the cylindrical protrusions and through the base portion 96.

During assembly of the cables 17 to the mirror structure, the wires 78 are first withdrawn from the cables 17 a sufficient distance to permit the wire heads 92 to be inserted through the large apertures 112. After all the heads have been threaded through the apertures 112, the wires 78 will be moved through the radial slots 114 to place them in the bores 110 of the cylindrical protrusions 102. Thereafter, the end of the individual cables 17 will be inserted and clamped into the bores 108.

Extending from the base 96 between two adjacent cylindrical protrusions 102 is a pin or finger 116 which is integral with the base 96 and which extends a distance beyond the protrusions 102 and 104, and which is adapted in the assembled position to extend through a slot 118 (FIG. 6) provided in the recessed center portion 88 of the mirror base 90 to thus align the mirror base with respect to the adapter and to prevent rotation of the mirror assembly.

After suitable securement of the cable ends in the adapter 98, the wire heads 92 of the wires 78, as mentioned before, are threaded through the apertures 86 in the center portion 88 of the mirror base 90. The apertures 86 are radially aligned with the wire apertures 110 in the adapter 98, which is accomplished by means of the guide pin or finger 116, to prevent the wires 78 from being bent or twisted. After all the wire heads 92 have been placed through their respective apertures 86, they are clamped to the inside of the recessed center portion 88 of the mirror base 90 by means of the clamp ring 94, such as is shown in FIG. 6. The clamp ring 94, as illustrated in FIG. 6, is not continuous but has an opening to clear the guide pin 116 and is provided with a plurality of radial slots 120 which correspond in number with the number of cable wires present in the assembly and which are equally angularly spaced at the same distance as the apertures 86. As shown in FIG. 6, the two end slots 120 extend to the inner edge of the clamp ring 94 whereas the middle slot extends outwardly. Thus, by placing the wires 78 through the slots 120, so that the wire heads 92 are on top of the clamp ring 94, the wires will be securely held in place on the mirror base 90 and the clamp ring 94 is prevented from shaking loose or being otherwise displaced by the oppositely directed arrangement of the slots 120, and at the same time the wires are held in proper angularly spaced position and prevented from twisting or moving within the apertures 86.

After the ends of the wires 78 have been secured in this fashion to the mirror base 90, the mirror element 14 is attached to the base preferably by means of applying an adhesive to the radial planar surface 91 of the mirror base which surrounds the recessed center portion 88. The mirror 14, including a suitable backing member (not shown), is then put in place by snapping it under the somewhat resilient crimped radial flange 93 of the mirror base, which coacts with the adhesive to securely hold the mirror element on the base 90.

To permit universal angular displacement of the mirror, the recessed center portion of the mirror base is formed to provide an outwardly disposed semi-circular concave socket 122 which is adapted to engage a complementary ball member 124 which is provided with a shank portion 126 adapted to be disposed within a central blind bore 128 in the adapter 98. The shank portion 126 of the ball member is hollow to receive an extension spring 130 for disposition between the base 96 of the adapter and the ball member to thus bias the ball member outwardly of the bore 128 and against the socket 122 to constantly maintain contact between the socket and the ball member and simultaneously maintain the cable wires 78 under tension. Thus, the mirror base 90 is supported on the adapter 98 for universal rocking movement about the ball member 124 against which the base is held by means of the cable wires 78. When it is desired to change the angle of position of the mirror, it is only necessary for the operator or occupant of the vehicle to manipulate the actuating button 76 in the vehicle compartment by depressing it angularly around the pivot member 64 which exerts a pull or push on the respective cable wires 78 which causes the mirror base 90 to be similarly angularly moved around the ball member 124. Upon release of the actuating button 76, the mirror will stay in its adjusted position and will not be shaken therefrom due to the spring tension against the mirror base 90 exerted by the spring 130.

With particular reference to FIG. 2, the ararngement shown therein differs from that in FIG. 3, only in that a quick disconnect coupling 132 is provided in the cable assembly between the mirror 14 and the control assembly 16. The disconnect coupling 132 is preferably positioned at the junction of the support bracket 20 with the outside body panel 34, that is, within the apertures 38 and 40 so that upon disconnection of the support bracket from the body panel access can be had to the disconnect coupling. In this instance, the retainer clip 28a is formed to provide an angularly recessed portion 134 extending through the panel aperture 40 which is provided with an aperture 38a to receive and retain a cable support member 136 which is non-rotatably secured within the recess 134 by means of a lock pin 138 extending through a side wall 135 of the recessed portion.

The cable assembly in the embodiment in FIG. 2 is comprised of two portions: a main cable portion 18a and a secondary mirror cable portion 18b. The main cable portion 18a is disposed within the body panels of the vehicle with one end attached to the control assembly 16 of either FIG. 2 or FIG. 4 in the same manner as described in connection with the embodiment in FIG. 3. The other end of the main cable portion 18a is connected to a cable support member 136 of the disconnect coupling 132 to which end the cable support member 136 is provided with a plurality of radially equally angularly disposed bores 140 (only one of which is shown) to receive and retain the ends of the individual cables 17a. The ends of the movable wires 78a extend out of the cables 17a and through apertures 142 which are co-axially aligned and communicate with the bores 140. The wires 78a extend out of the cable support member 136 to be securely attached to an intermediate pivot member 144 which is pivotally supported on the cable support member by means of a ball and socket connection comprising a semispherical socket 146 formed in the rear surface of the pivot member which is adapted to be engaged by a complementary ball member 148 associated with the cable support member 136. The ball member 148 has a hollow cylindrical shank portion 150 for insertion into a blind bore 152 centrally located on the cable support member 136 for axial sliding movement therein. An expansion spring 154 is disposed in the blind bore 152 and extends into the shank portion 150 of the ball member to constantly tend to bias the ball member outwardly against the intermediate pivot member 144 and thus pre-tensioning the cable wires 78a.

The front surface of the intermediate pivot member 144 opposite the socket 146 is provided with a ball stud 156 having a ball head 158 which pivotally movably extends into a cylindrical socket 162 of a second intermediate pivot member 160 which is pivotally supported on an adapter 164 which is integral with or secured to an internal wall portion 165 within the support bracket 20. The rear surface of the second intermediate pivot member 160 is formed with a semi-spherical socket 166 adapted to engage a ball member 168 provided on the adapter 164 and is held in engagement therewith by means of the spring 154 which biases both intermediate pivot members 144 and 160 into engagement with each other and with their respective supports so that in the assembled position there will always be a positive connection between these members.

The secondary mirror cable portion 18b is comprised only of individual wires 78b since, due to the relative shortness of this cable portion, no outer cables or sheathing are needed. The wires 78b, which correspond in number to the number of wires 78a of the main cable portion, are attached to the mirror assembly in a manner identical to that described with reference to FIG. 3 and which need therefore not to be repeated. The other ends of the wires 78b are threaded through appropritae angularly spaced apertures 170 (only one of which is shown) provided in the adapter 164 for relative sliding movement therein. The wires 78b extend through the adapter for attachment to the second intermediate pivot member 160 in any known manner.

The opposed wire ends of the wires 78a and 78b are secured to their respective members 144 and 160 in such fashion that each wire is axially aligned with a respective opposite wire in order that a proper continuous motion will be transmitted through the cable assembly. Thus, if it is desired to angularly adjust the mirror 14, the operator angularly depresses the actuating button 76 of the control assembly by which a pull or push will be exerted on one of the plurality of wires 78a. This causes a corresponding angular movement of the first intermediate pivot member 144. Due to the ball and cylindrical socket connection between the first and second intermediate pivot members, the angular motion will be transferred by the ball head 158 acting as a lever on the inner side wall of the cylindrical socket 162 to angularly tip the second intermediate pivot member 160 around its pivot to produce a corresponding pull or push on one of the wires 78b of the secondary mirror cable assembly causing the mirror to be angularly repositioned. The adjusted position of the mirror will be maintained under any driving conditions due to the combined expanding forces of spring 130 at the mirror pivot and spring 154 in the disconnect coupling which maintain tension on the wires 78a and 78b in any position of the adjustable mirror.

If it becomes necessary to service or replace the mirror assembly 10, the entire assembly can be quickly disconnected from the vehicle without disassembly or disturbance of the main cable control assembly within the body panels of the vehicle. This is accomplished by disconnecting the support bracket 20 from the vehicle body to gain access to the disconnect coupling 132 which then can be disconnected by snapping the second intermediate pivot member 160 off the ball head 158 of the other intermediate pivot member 144. Thus, it will be seen that the main cable portion 18a, including the attachment to the support cable 136 and the intermediate pivot member 144, will remain completely intact and undisturbed for reattachment to a repaired or replaced mirror assembly in the same manner as described.

It will be obvious that the positions of the two intermediate pivot members 144 and 160 can be interchanged without any adverse effect upon the operation of the cable assembly.

Thus, the present invention provides an improved cable assembly for remotely controlled devices by which the controlled device can be easily and conveniently disconnected from the main portion of the cable assembly without disturbing the original set-up and arrangement of the main cable assembly within the vehicle body structure.

It is apparent that a construction has been provided which produces a remotely controllable rear view mirror assembly which can be manufactured at a much lower cost than heretofore possible and which can be installed and disassembled much more economically and conviently than with the prior art assembly.

The particular construction permits the parts to be shipped substantially in disassembled form and to be assembled while being installed in the cable control assembly, the cup 50 or 50a and member 62 are preassembled with the cables 17 or 17a in place. This assembly is then installed in a door panel or other suitable place of the automobile in a position properly locating the cable 17 or 17a. This is necessary to assure that actuating of the control button in one area will produce a similar actuation of the mirror element 14.

It is also apparent that a mirror has been described which is positioned in response to manipulative movement by an operator control button which movement is transmitted through the cable assembly to the mirror element in a manner which permits the cables to be separately assembled within the vehicle and then separately assembled and connected to the control assembly and the mirror assembly. It can be further seen that an actuating button has been described which is recessed within a housing substantially flush with the door panel or the like so that it eliminates the possibility of an injury producing hazard to an occupant of the vehicle in the event of a sudden deceleration of the vehicle.

Although we have described several preferred embodiments of the invention, many changes and modifications can be made therein without departing from the spirit of the invention as expressed by the scope of the appended claims.

Having thus described our invention, we claim:

1. A push-pull cable control mechanism for a remotely controlled device comprising a cable composed of a first set of a plurality of wires attached at one end to a control knob, a second set of a plurality of wires attached at one end to said remotely controlled device, and quick release coupling means connecting the other ends of said first and second set of a plurality of wires to enable disconnection of said remotely controlled device without disturbance of said cable control mechanism, said quick release coupling means comprising a multiple flexible ball and socket joint being arranged in series, an intermediate one of said multiple ball and socket joint provided with means to permit disconnection of said intermediate one of said multiple ball and socket joint.

2. In the cable control mechanism as defined in claim 1, said disconnect means comprising a cylindrical socket member adapted to be engaged by a complementary ball member normally biased inwardly of said cylindrical socket member by said resilient means.

3. A push-pull cable control mechanism for a remotely controlled device comprising a cable composed of a first set of a plurality of wires attached at one end to a control knob, a second set of a plurality of wires attached at one end to said remotely controlled device, and quick release coupling means connecting the other ends of said first and second set of a plurality of wires to enable disconnection of said remotely controlled device without disturbance of said cable control mechanism, said quick release coupling means comprising a first stationary support member for support and extension therethrough of said other ends of said first set of a plurality of wires, a first pivot member pivotally supported on said first support member, a second pivot member pivotally supported on said second support member, said ends of said first set of wires attached to said first pivot member, said ends of said second set of a plurality of wires attached to said second pivot member, and releasable pivotal connection means between said first and said second pivot member to transfer longitudinal movement of said second set of a plurality of wires through said first and said second pivot members.

4. In the cable control mechanism defined in claim 3, said releasable pivotal connection means comprising a ball member on said first pivot member, a complementary cylindrical socket member on said second pivot member adapted for engagement with said ball member, said cylindrical socket member having straight side surfaces engaged by said ball member, so that upon rocking movement of said first pivot member by movement of said first set of wires through actuation of said control knob a similar opposite rocking movement will be imparted upon said second pivot member.

5. In the cable control mechanism defined in claim 4, said releasable pivotal connection means being provided with resilient means to maintain said ball member in engagement with said cylindrical socket member.

6. A remotely controlled assembly comprising: universally supported controlled means universally movable about a point; control means; a first plurality of motion transmitting elements having first and second ends with the first ends thereof operatively connected to said control means for longitudinal movement thereby; a second plurality of motion transmitting elements having first and second ends with the first ends thereof operatively connected to said controlled means at positions about an axis passing through said point for moving the latter upon longitudinal movement thereof; releasable coupling means operatively connecting said second ends of said first plurality of motion transmitting elements with said second ends of said second plurality of motion transmitting elements; said coupling means including a first universally supported member connected to said second ends of said first plurality of motion transmitting elements, a second universally supported member connected to said second ends of said second plurality of motion transmitting elements and releasable pivotal connection means operatively interconnecting said first and second members for transferring longitudinal movement of said first plurality of motion transmitting elements to said second plurality of motion transmitting elements.

7. An assembly as set forth in claim 6 wherein said universally controlled means includes mirror means and support means supporting said mirror means for universal movement.

8. An assembly as set forth in claim 6 wherein said coupling means further includes a first stationary support member universally supporting said first universally supported member and a second stationary support member universally supporting said second universally supported member.

9. An assembly as set forth in claim 8 wherein said releasable pivot connection means includes a ball and socket.

10. An assembly as set forth in claim 9 including biasing means for maintaining said first and second pluralities of motion transmitting elements in tension.

11. An assembly as set forth in claim 8 wherein said second ends of said motion transmitting elements are equally spaced about the point of universal movement between said first and second universally supported members.

References Cited

UNITED STATES PATENTS

| | | | |
|---|---|---|---|
| 2,148,867 | 2/1939 | Lesage | 74—501 |
| 2,632,363 | 3/1953 | Persson | 74—501X |
| 2,957,353 | 10/1960 | Babacz | 74—501 |
| 3,046,841 | 7/1962 | Kawecki | 74—501X |
| 3,407,683 | 10/1968 | Liedel | 74—501 |
| 3,442,151 | 5/1969 | Brawner et al. | 74—501 |

MANUEL A. ANTONAKAS, Primary Examiner